No. 684,304. Patented Oct. 8, 1901.
J. PFLEGING.
LEAD FOR SETTING STAINED GLASS.
(Application filed May 31, 1901.)
(No Model.)
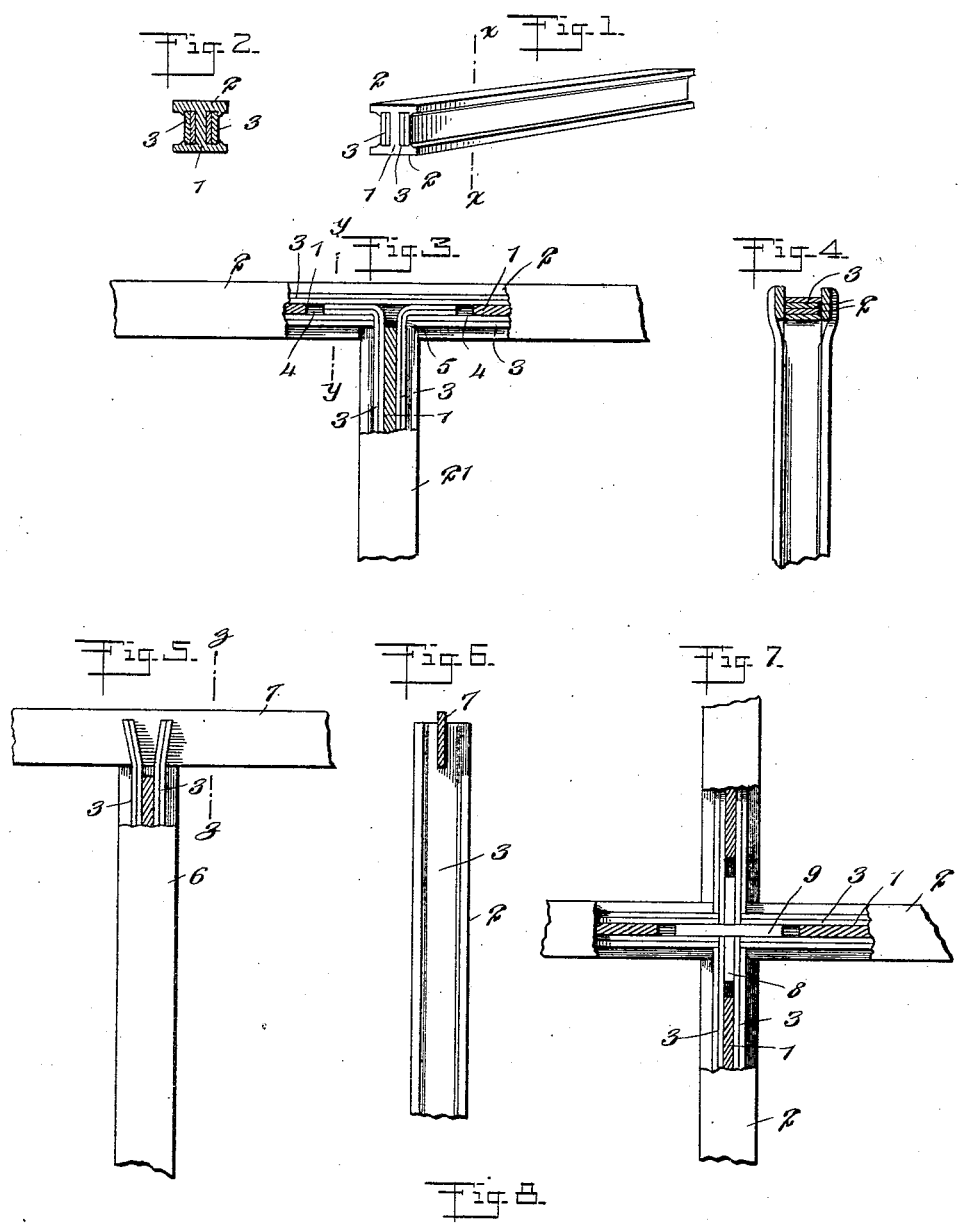
WITNESSES:
INVENTOR
Jacob Pfleging
BY
ATTORNEYS

UNITED STATES PATENT OFFICE.

JACOB PFLEGING, OF NEW YORK, N. Y.

LEAD FOR SETTING STAINED GLASS.

SPECIFICATION forming part of Letters Patent No. 684,304, dated October 8, 1901.

Application filed May 31, 1901. Serial No. 62,517. (No model.)

*To all whom it may concern:*

Be it known that I, JACOB PFLEGING, a citizen of the United States, and a resident of the city of New York, borough of the Bronx, in the county and State of New York, have invented a new and Improved Lead for Setting Stained Glass, of which the following is a full, clear, and exact description.

This invention relates to improvements in leads-for setting glass; and the object is to provide a lead with stiffening devices at each side of the heart whereby the lead will be prevented from bending or distortion under ordinary strains; and another object is to provide a novel means for connecting or joining the leads one with another.

I will describe a lead for setting stained glass embodying my invention and then point out the novel features in the appended claims.

Reference is to be had to the accompanying drawings, forming a part of this specification, in which similar characters of reference indicate corresponding parts in all the figures.

Figure 1 is a perspective view of a lead embodying my invention. Fig. 2 is a section on the line $x\ x$ of Fig. 1. Fig. 3 is a sectional view showing a means for joining leads one with another. Fig. 4 is a section on the line $y\ y$ of Fig. 3. Fig. 5 shows another form of joint. Fig. 6 is a section on the line $z\ z$ of Fig. 5. Fig. 7 shows a joint for the meeting ends of four leads, and Fig. 8 is a perspective view of the four lead joints.

Referring to the drawings, 1 designates the heart of the lead, and 2 the caps or heads, the said caps or heads being extended laterally in the usual manner. Arranged along the sides of the heart are stiffening devices consisting of tin or other suitable metal. I have here shown two of said stiffening devices 3 at each side of the heart, although it is to be understood that but one on a side need be employed. These stiffening devices are secured in place by turning the inner surfaces of the caps against the outer surfaces of the stiffeners by a suitable tool—such, for instance, as by a roller suitably beveled at its sides.

In joining two leads, as indicated in Fig. 3, a portion of the heart of one lead is removed, as indicated at 4, and also a portion of the heart of the other lead is removed and the stiffening-strips are turned outward at a right angle and inserted in the openings or spaces 4 and soldered therein. Of course the strip or lead in which the ends of the stiffeners are inserted will have an opening at one side, as indicated at 5, through which the stiffening devices of the other lead may pass.

In Fig. 5 I have shown the connection of a lead 6 with a metal strip or joint 7. A portion of the heart of the lead 6 is removed and the projected ends of the stiffening-strips are kerfed to receive the plate 7, which is soldered therein.

In Fig. 7 I have shown four leads as joined together. The joint consists of two plates 8 and 9, which are halved together or crossed, and these plates are inserted between the stiffening-strips and soldered. Of course the heart at this portion of the lead or at the ends must be removed, as clearly indicated in Fig. 7.

By my method of connecting the joints or abutting portions of leads it is obvious that the leads will be materially strengthened at said joints. The ordinary practice is to connect one lead with another by abutting the end of one lead against the side of the other lead and soldering the parts together, and such joints are easily broken.

Having thus described my invention, I claim as new and desire to secure by Letters Patent—

1. A joint for leads, having stiffening-strips, comprising a part extended from one lead and secured between the stiffening-strips of another lead, substantially as specified.

2. A joint for leads, comprising stiffening-strips having their ends turned outward and inserted between the stiffening-strips of other leads and soldered, substantially as specified.

3. In a lead for setting stained glass, stiffening-strips secured in the lead on opposite sides of the heart, substantially as specified.

4. In a lead for setting stained glass, two stiffening-strips at each side of the heart of the lead, the cap portions of the lead having parts turned down upon the stiffening-strips, substantially as specified.

In testimony whereof I have signed my name to this specification in the presence of two subscribing witnesses.

JACOB PFLEGING.

Witnesses:
JNO. M. RITTER,
C. R. FERGUSON.